(12) United States Patent
Micault

(10) Patent No.: US 12,508,038 B2
(45) Date of Patent: Dec. 30, 2025

(54) SURGICAL INSERTION GUIDE

(71) Applicant: CENTRE HOSPITALIER UNIVERSITAIRE DE CAEN NORMANDIE, Caen (FR)

(72) Inventor: Emmanuel Micault, Caen (FR)

(73) Assignee: CENTRE HOSPITALIER UNIVERSITAIRE DE CAEN NORMANDIE, Caen (FR)

( * ) Notice: Subject to any disclaimer, the term of this patent is extended or adjusted under 35 U.S.C. 154(b) by 159 days.

(21) Appl. No.: 18/556,413

(22) PCT Filed: Jun. 3, 2022

(86) PCT No.: PCT/EP2022/065258
§ 371 (c)(1),
(2) Date: Oct. 20, 2023

(87) PCT Pub. No.: WO2022/254036
PCT Pub. Date: Dec. 8, 2022

(65) Prior Publication Data
US 2024/0180564 A1 Jun. 6, 2024

(30) Foreign Application Priority Data
Jun. 3, 2021 (EP) .................................... 21305750

(51) Int. Cl.
*A61B 17/56* (2006.01)
*A61B 17/17* (2006.01)
*A61B 34/30* (2016.01)

(52) U.S. Cl.
CPC .......... *A61B 17/1739* (2013.01); *A61B 17/56* (2013.01); *A61B 34/30* (2016.02); *A61B 2017/568* (2013.01)

(58) Field of Classification Search
CPC ................ A61B 17/1739; A61B 17/56; A61B 2017/568
See application file for complete search history.

(56) References Cited

U.S. PATENT DOCUMENTS 9,204,977 B2 * 12/2015 Bollinger .............. A61F 2/4609
11,751,890 B2 * 9/2023 Fischler ............. A61B 17/1703
606/129

(Continued)

FOREIGN PATENT DOCUMENTS

| EP | 3662858 A1 | 6/2020 |
|---|---|---|
| WO | 2019071141 A1 | 4/2019 |

OTHER PUBLICATIONS

International Search Report from International Application No. PCT/EP2022/065258 Sep. 27, 2022, 3 pgs.

*Primary Examiner* — Ellen C Hammond
(74) *Attorney, Agent, or Firm* — Tutunjian & Bitetto, P.C.

(57) ABSTRACT

A personalized insertion guide for the mini-invasive insertion of a device through a target bone, includes a guide platform securable to a fixation bone, presenting an internal bone contact surface being a matching negative of the fixation bone surface in order to allow one single precise positioning of it. At least one insertion channel is configured to receive the device. At least one bone fixation structure secures the guide platform to the fixation bone. The guide platform is designed by means of a presurgical modelling of the fixation bone, based on a geometrical analysis of its surface. The guide enables, once positioned on the fixation bone, to set the origin of a referential with regards to a biological target element inside the body. The guide platform includes a first part and second part extending in two different plans.

12 Claims, 4 Drawing Sheets

(56) References Cited

U.S. PATENT DOCUMENTS

| | | | |
|---|---|---|---|
| 12,303,140 B2 * | 5/2025 | Cundiff | A61B 17/151 |
| 12,303,147 B2 * | 5/2025 | Carlo, III | A61B 17/17 |
| 12,303,148 B2 * | 5/2025 | Fischler | A61B 17/1739 |
| 2009/0312801 A1 * | 12/2009 | Lemoine | A61B 17/8061 606/301 |
| 2016/0008144 A1 | 1/2016 | Bollinger | |
| 2020/0170723 A1 * | 6/2020 | Crawford | A61B 34/10 |
| 2020/0281655 A1 * | 9/2020 | Cen | B29C 64/393 |
| 2020/0315751 A1 * | 10/2020 | Alrumaih | A61B 34/10 |

* cited by examiner

SURGICAL INSERTION GUIDE

FIELD OF INVENTION

The present invention relates to a safe a mini-invasive insertion device regarding general insertion operations during surgery in a sensitive environment.

BACKGROUND OF INVENTION

The skull anatomy is complex. It protects many vital and functional structures. To reach those internal structures without injuring others, it's necessary to practice minimally-invasive surgery access.

Regarding current practice, it is common knowledge, that in order to obtain this access, it's necessary to use complex stereotaxic systems and CT scan during surgery. In the particular example of accessing the cranial vault, this is explained by the fact that the cranial vault is spheric and it's impossible to use local precise guide to determine said access. That's why it is currently necessary to use external guides, independently of the anatomy of the patient.

However, those guides may not be adaptable precisely enough for each patient, depending on how different each anatomy is from the used global model. This ca, in some cases lead to precision issues which may lead to injuries during surgical interventions.

There is therefore a need for a local stereotaxic guide specific to the anatomy of each patient. Regarding the cranial vault, such a minimally-invasive guide could be based on the anatomy of the temporal bone of the patient which is a part of the skull. This way, the guide would be adapted to each possible anatomy and many precision issues would be solved.

The objective of the present invention, is thus to propose a local stereotaxic guide specific to the anatomy of each patient.

SUMMARY

The here above-mentioned objective is reached by means of the present invention, as it relates to a personalized surgical insertion guide configured to enable the mini-invasive and precise insertion of an elongated device in, through or beyond a target bone of a patient, said surgical insertion guide comprising:
  a guide platform configured to be removably secured to a patient's fixation bone, the guide platform presenting an internal bone contact surface and an external surface, the internal bone contact surface being a matching negative of the fixation bone surface in order to allow one single precise positioning of the guide platform on the fixation bone,
  at least one insertion channel extending through the guide platform, the insertion channel being configured to receive the elongated device, at least one bone fixation structure enabling the safe securing of the guide platform to the patient's fixation bone.

In the present invention, the matching of the internal bone contact surface of the guide platform with the fixation bone surface is obtained by means of designing a 3D presurgical modelling of the patient's fixation bone, said modelling being based on a geometrical analysis of the fixation bone surface. In the present invention, the surgical insertion guide is designed to enable, once positioned on the fixation bone, to set the origin of a 3D insertion referential with regards to a biological target element inside the patient's body in order to define an insertion axis enabling the mini-invasive and precise insertion of the elongated device. In the present invention, the guide platform comprises a first part and a second part extending in two different plans, the first part being configured to cooperate with the fixation bone surface and the second part being configured to cooperate with a surface of a hole or a cavity comprised or communicating with the fixation bone. This guide according the present invention may thus be directly applied on a fixation bone, for example the temporal bone, of a patient and has thus a specific design that ensures a unique position when in use. This unique position assures a unique minimally invasive trajectory to access, in an extremely precise way, a biological target element, for example the cochlea, located behind the target bone of the patient, for example in the skull. This increased precision thus enables to carry out very delicate surgical actions in/on very delicate parts of the human body in a very reliable and safe way.

The personalized surgical insertion guide according to the invention may comprise one or several of the following features, taken each one on their own in an isolated way or combined with each other:
  the guide platform may comprise a third part extending in a third plan different from the two other plans, this third part being configured to cooperate with a second surface of the hole or the cavity comprised or communicating with the fixation bone,
  the at least one insertion channel may extend from the guide platform external surface, along a predetermined insertion axis, the predetermined insertion axis being calculated to connect the set origin of the 3D insertion referential on the fixation bone of the patient to the biological target element situated behind the target bone,
  the biological target element may be the cochlea, the target bone may be the Bony Labyrinth and the fixation bone may the temporal bone of the patient,
  wherein the first part of the guide platform is configured to cooperate with the temporal bone of the patient, the second part of the guide platform is configured to cooperate with the surface of the external auditive conduct of the patient and the third part of the guide platform is configured to cooperate with the surface of the zygomatic process of the temporal bone of the patient,
  the biological target element may be a spot inside the patient's brain, the target bone may be the skull and the fixation bone may be the temporal bone of the patient,
  the insertion channel may display a general U shape,
  the bone fixation structure may comprise three fixation holes formed in the guide platform, said fixation holes being configured to cooperate each one with a fixation screw, in order to screw the guide platform to the fixation bone,
  the surgical insertion guide may enable, once secured to the fixation bone of the patient, to block the six degrees of freedom defined by the 3D insertion referential, during an insertion operation, for the elongated device to be inserted,
  the elongated device to be introduced may be a milling bit,
  the internal bone contact surface and the external surface of the guide platform may be two separated elements which can be assembled in order to form the complete guide platform,
  the external surface of the guide platform comprises a stabilization surface configured to be put under pressure in order to reinforce the contact between the internal bone contact surface and the fixation bone, thus leading to a stabilization of the positioning of the guide platform on the fixation bone.

The present invention further comprises a personalized surgical insertion system comprising an insertion guide according to any one of claims and an insertion robot configured to manipulate the elongated device.

The present invention also comprises a personalized surgical insertion method implemented by means of a personalized surgical insertion guide according to any one claims 1 to 11, the method comprising following steps in the order of enunciation:
running a geometrical analysis of the surface of the fixation bone of the patient,
realizing a 3D model of the fixation bone and its surface,
designing the guide platform in order to create a perfectly matching internal bone contact surface,
3D printing the personalized surgical insertion guide or internal bone contact surface,
positioning the personalized surgical insertion guide on the fixation bone of the patient,
securing the personalized surgical insertion guide on the fixation bone of the patient,
introducing the elongated device inside the insertion channel.

The method may further comprise the step of:
determining the predetermined insertion axis by means of a 3D modeling of the biological target element with regards of the target and fixation bones,
inserting the elongated device inside the target bone up to the maximal depth enabled by the length of the insertion channel.

In some particular cases, the insertion of the elongated element is carried out automatically by means of a robot.

BRIEF DESCRIPTION OF THE DRAWINGS

The invention will be better understood, and other purposes, details, features and benefits of the invention will be more clearly exposed in the subsequent detailed description of embodiments of the invention given as purely illustrative and non-exhaustive examples, with reference to following drawings.

DETAILED DESCRIPTION

Figure 7:
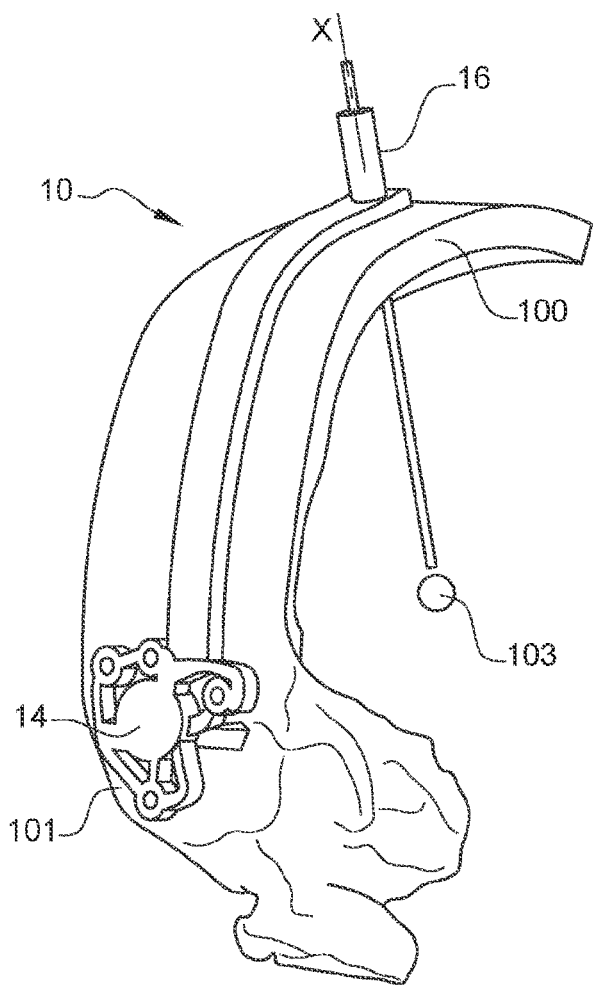
FIG. 7 is a perspective view of a sixth embodiment of the invention.

A personalized surgical insertion guide 10 according to the present invention is configured to enable the mini-invasive and precise insertion of an elongated device 12 in, through or beyond a target bone 100 of a patient. Said personalized surgical insertion guide 10 is configured to be secured to a patient's fixation bone 101. The fixation bone 101 is characterized in that it comprises a hole 102a or a cavity 102b or communicates with said hole 102a or a cavity 102b (see FIG. 2). In the most cases the target bone 100 surrounds at least partially, a biological target element 103 inside the patient's body which of some interest depending on the procedure to be achieved. In some embodiments, the target bone 100 and the fixation bone 101 can be the same bone and in some other embodiments, the target bone 100 and the fixation bone can be different. In some embodiment, the biological target element 103 is the cochlea, the target bone 100 is the Bony Labyrinth and the fixation bone 101 is the temporal bone of the patient (see FIG. 4). In some further embodiment, the biological target element 103 is a spot inside the patient's brain (for example a small tumor), the target bone 100 is the skull and the fixation bone 101 is the temporal bone of the patient (see FIG. 7).

In some cases, the elongated device 12 to be introduced is a milling bit. The elongated device 12 may also be a catheter, a screw or any sort of sensor.

In some embodiments, the personalized surgical insertion guide 10 is part of a surgical insertion system in which an insertion robot not represented) is configured to manipulate the elongated device 12.

Figure 2:
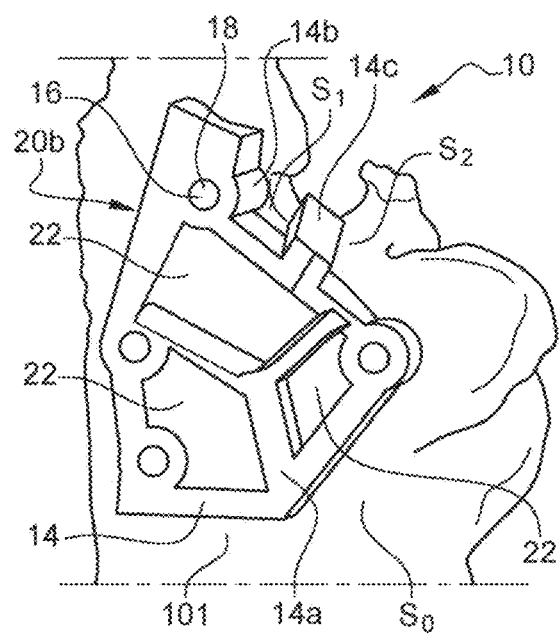
FIG. 2 is a perspective view from above of the invention according to a first embodiment.

As can be seen on FIG. 2, a personalized surgical insertion guide 10 according to the present invention comprises a:
a guide platform 14 configured to be removably secured to the patient's fixation bone 101,
at least one insertion channel 16 extending through the guide platform 14, and being configured to receive the elongated device 12,
at least one bone fixation structure 18 enabling the safe securing of the guide platform 14 to the patient's fixation bone 101.

In some preferred embodiment, the surgical insertion guide 10 is 3D printed after a presurgical modelling phase. The used materials are all sterilized and biocompatible.

The guide platform 14 presents two surfaces 20a, 20b:
an internal bone contact surface 20a, and
an external surface 20b.

The internal bone contact surface 20a is a matching negative of the surface $S_0$ of fixation bone 101. This allows one single precise positioning of the guide platform 14 on the fixation bone 101, as can be seen on FIGS. 3B and 7.

The guide platform 14 is thus designed by means of a 3D presurgical modelling of the patient's fixation bone 101, said modelling being based on a geometrical analysis of the surface of the fixation bone 101. In some embodiments, the guide platform 14 displays a design virtually adapted to the surface of the temporal bone of the patient. More precisely, during the presurgical modelling phase of the guide platform 14, a Boolean operation (surface subtraction) is performed on the internal bone contact surface 20a with the surface $S_0$ of the fixation bone 101. This creates a perfect congruence between the internal bone contact surface 20a of the guide platform 14 and the surface $S_0$ of the fixation bone 101, for example the surface $S_0$ of the temporal bone. This perfect congruence in three predetermined orthogonal plans enables to adapt the design of the guide platform 14 to a unique position on the patient's fixation bone 101. This unique position allows to extremely precisely respect the trajectory defined in 3D presurgical modelling.

In some embodiments, the internal bone contact surface 20a, and the external surface 20b of the guide platform 14 are formed by two separated elements which can be secured to each to each other in order to form the complete guide platform 14. The external surface 20b may thus be a generic piece of fabric which can be used indifferently in any patient while the internal bone contact surface 20a is a personalized surface specifically modelled and produced for each individual patient according to their anatomical specificities. This enables a quicker presurgical production as only part of the guide platform 14 has to be produced and also enables to reduce production costs as part of the guide platform 14 can be produced on a broad scale.

Figure 1:
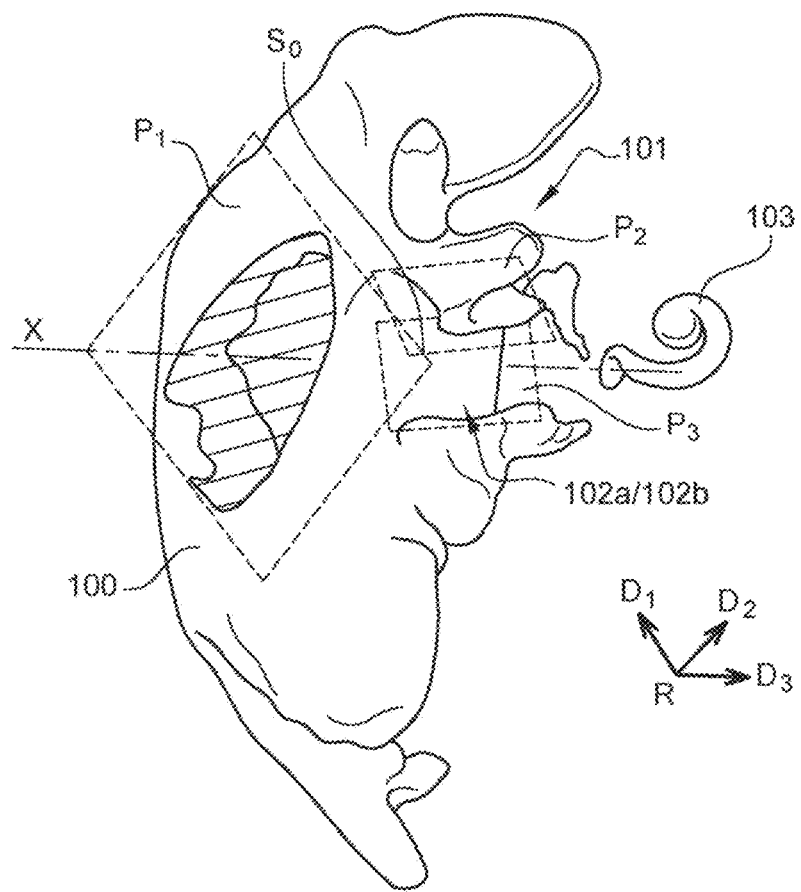
FIG. 1 is a perspective partial view of a patient's temporal bone

The guide platform 14 further comprises a first part 14a and a second part 14b generally extending in two different directions D1, D2, (see FIG. 1) according to two different planes P1, P2 (see FIG. 1). In some embodiments, the guide platform 14 comprises a third part 14c extending in a third direction D3, according to a third plane P3 different from the two other directions D1, D2 and planes P1, P2 (see FIG. 1).

In this specification, a plane is defined as the general geometrical plane. A surface extending in such a plane is understood as generally extending in this geometrical plane, even if said surface may not be completely planar and regular and may, locally, not be comprised within the geometrical plane.

When the guide platform 14 is put in place on the patient, the first part 14a of the guide platform 14 thus cooperates with the surface $S_0$ of the fixation bone 101 and the second part 14b of the guide platform 14 thus cooperates with a surface $S_1$ of the hole 102a or cavity 102b comprised or communicating with the fixation bone 101. In the embodiments where the guide platform 14 comprises a third part 14c, this third part 14c, once the guide platform 14 is in place, cooperates with a second surface $S_2$ of the hole 102a or the cavity 102b comprised or communicating with the fixation bone 101. This enables a very safe, stabile and precise positioning of the guide platform 14 on the patient. Actually, as long the single precise positioning of the surgical insertion guide 10 is not met on the patient's fixation bone 101, the surgical insertion guide does not fit correctly and it shows and feels. The surgical insertion guide 10 thus enables, once correctly positioned on the fixation bone 101, to set the origin of a 3D insertion referential R with regards to the biological target element 103 inside the patient's body.

In some embodiments, the surgical insertion guide 10 defines a predetermined insertion axis X being calculated during the presurgical modelling phase. This predetermined insertion axis X is calculated to connect the set origin of the 3D insertion referential R on the fixation bone 101 to the biological target element 103 situated behind the target bone 100. More precisely, said predetermined insertion axis X is calculated in order to enable a safe and precise insertion of the elongated device 12 without hurting or damaging any sensitive biological element surrounding the surgical area, like for example the facial nerve, middle ear ossicles, corda tympani, external auditory canal around the cochlea during a cochlear implant surgery. It allows to have an access to the first cochlea ride in an optimal insertion axis X to minimize the injury of the basilar blade in the tympanic ramp.

Thanks to the present invention, an operator can reach a high insertion precision during surgery. More precisely, the present invention enables to achieve a difference inferior 0.61 mm between the predetermined insertion axis X and the actual insertion path. In the particular case in which the fixation bone 101 is the temporal bone, the distance between the biological target element 103 and the surface of the fixation bone 101 is approximatively of 3 cm. This enables to safely access a biological target element 103 in a complex spongy bone (in this case, the target bone 100 is the bony labyrinth) only with a milled canal of 2 mm width. This enables a high safety improvement for delicate surgery in sensitives area like the cochlea area or the brain area, for example.

The surgical insertion guide 10 according to the present invention offers thus a guide with the two essential components for delicate insertion operations:
- a personalized predetermined insertion axis X reaching the biological target element 103 without damaging surrounding biological tissues or structures, like for example the external auditory canal, the facial nerve, the cord of the eardrum and the stapes,
- a personalized internal bone contact surface 20a that perfectly fits to the surface $S_0$ of the fixation bone, for example the temporal bone.

In the embodiment where the biological target element 103 is the cochlea of the patient, the first part 14a of the guide platform 14 is cooperates with the surface $S_0$ of the temporal bone of the patient, the second part 14b of the guide platform 14 cooperates with a first surface $S_1$ of the external auditive conduct of the patient and the third part 14c of the guide platform 14 cooperates with a second surface $S_2$ of the zygomatic process of the temporal bone of the patient.

Preferably, the guide platform 14 comprises at least one window 22 allowing an operator to see the fixation bone 101 once the guide platform 14 is secured to it. Preferably, the guide platform 14 comprises three windows, as can be seen on FIGS. 2, 3A and 3B. Those windows also enable to obtain a lighter structure which is thus easier to secure to the fixation bone 101. More specifically case of a milling operation during a cochlear implant implantation, in order to allow an initial milling perpendicular to the temporal bone (fixation bone 101) surface $S_0$ and thus limiting the deviation of the drill (the elongated device 12 in this case), a pre-hole has to be made on the fixation bone 101 at its entry point with a 3 mm bur. A 4 mm window 22 in the guide platform 14 at the level of the external auditory canal allows an operator to check that the drill was not deflected during the first contact with the temporal bone.

Figure 3A:
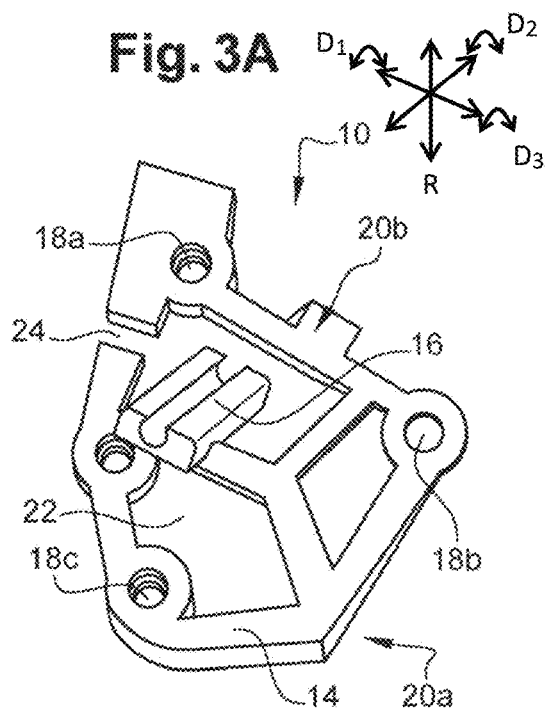
FIG. 3A is a perspective view from above of the invention according to a second embodiment.

In some embodiments, as can be seen on FIG. 3A, the at least one window 22 of the guide platform 14 displays a lateral opening 24 perpendicular to the insertion direction. This lateral opening 24 enables to safely approach or remove, sideways, any sort of bulky insertion device 12 or part of a bulky insertion device 12 from the insertion point of the surgical insertion guide 10.

In some embodiments, the insertion channel 16 and the at least one bone fixation structure 18 are the same technical element, as for example in FIG. 2. In those embodiments, the elongated device 12 is for example a screw. Each elongated device 12 is thus inserted inside the fixation bone 101 and the target bone 100 through the corresponding insertion channel 16 which also is a bone fixation structure 18.

Figure 3B:
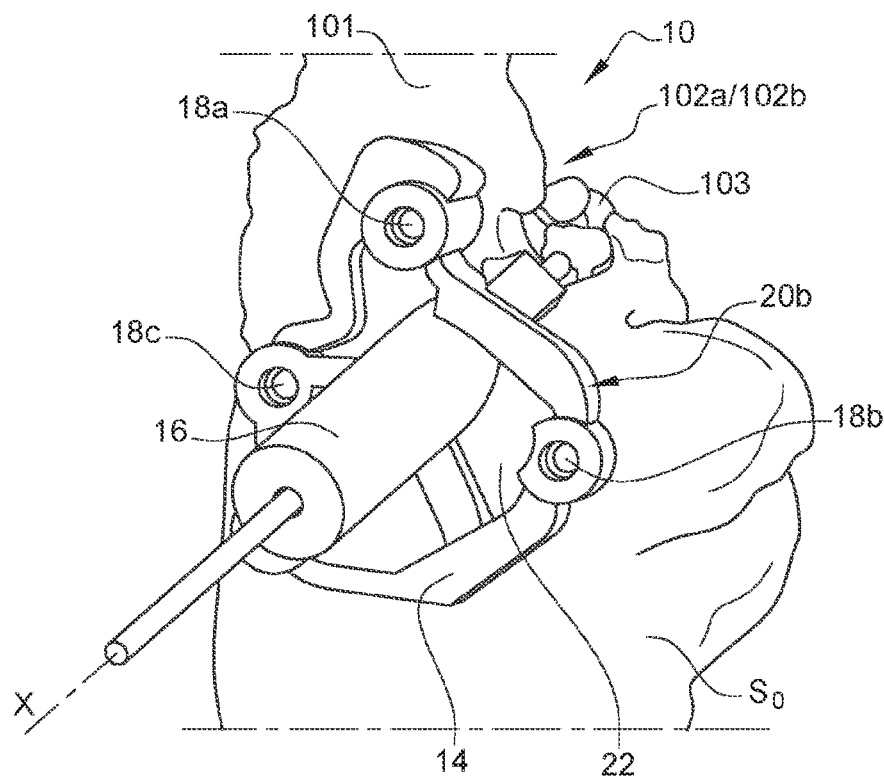
FIG. 3B is a perspective view from above of the invention according to a third embodiment.
Figure 4:
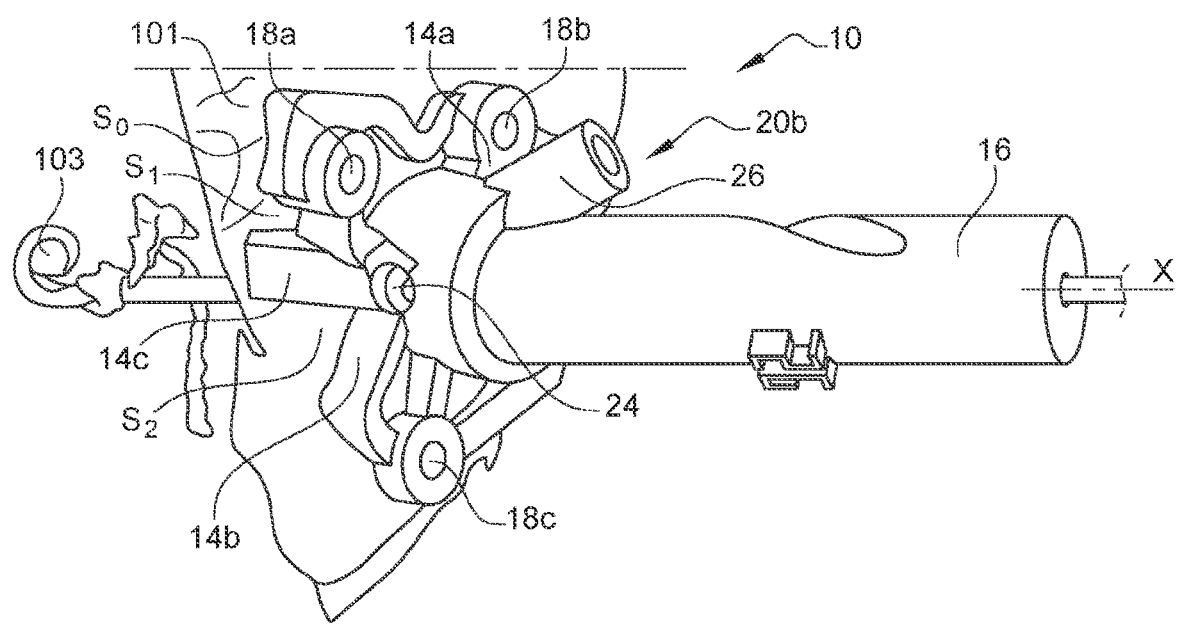
FIG. 4 is a side perspective view of the invention according to a fourth embodiment.

In some other embodiments, as illustrated on FIGS. 3A, 3B and 4. the at least one insertion channel 16 and the at least one bone fixation structure 18 are separated technical elements. In those embodiments, the insertion channel 16 extends, from the external surface 20b of the guide platform 14 outwardly from the patient. In those embodiments, the insertion channel 16 extends along the predetermined insertion axis X. The insertion channel 16 may be removable secured to the external surface 20b of the guide platform 14. It might be clipped on the external surface 20b. Different kinds of insertion channels 16 might thus be secured to the external surface 20b depending on the schedule surgical intervention, as can be seen on FIGS. 4 and 7, for example. On FIG. 4, the insertion channel 16 has a 10 mm diameter and a 4 cm length with a 2.05 mm diameter canal to guide a 2 mm diameter elongated device 12, which is a drill.

As can be seen on FIG. 3A, in those embodiments, the insertion channel 16 can display a general U shape. This enables an easier retrieval of the elongated device 12 once the surgical intervention has stopped. In such an embodiment, as can be seen on FIG. 3A, if the at least one window 22 of the guide platform 14 displays a lateral opening 24 perpendicular to the insertion direction, this lateral opening 24 enables to safely introduce or retrieve, sideways, any sort of bulky insertion device 12 or part of a bulky insertion device 12 inside the U-shaped insertion canal 16.

Thanks to this insertion channel 16, the surgical insertion guide 10 enables, once secured to the fixation bone 101, to block the six degrees of freedom (e.g., translation and rotation for each axes D1, D2, and D3) defined in the 3D insertion referential R, during an insertion operation, for the elongated device 12 during insertion.

Figure 5:
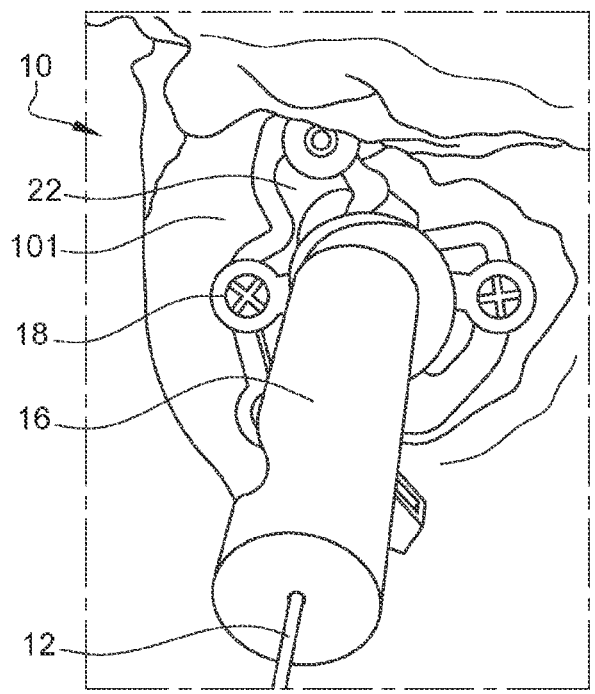
FIG. 5 is a view from above of the third embodiment of the invention, secured to the fixation bone of a patient.

In those embodiments, and as can be seen on FIGS. 3A, 3B and 4 the bone fixation structure 18 comprise three fixation holes 18a, 18b, 18c formed in the guide platform 14. Each fixation hole 18a, 18b, 18c is configured to cooperate with a fixation screw (see FIG. 5), in order to screw the guide platform 14 to the fixation bone 101 and safely secure the surgical insertion guide 10 during the surgery. In some alternative embodiments (not shown), the fixation structure 18 may include some spikes or hooks, for example.

In some embodiments, the personalized surgical guide 10 comprises an irrigation channel 26 being in fluidic communication with the insertion channel 16 (see FIG. 4). this irrigation canal 26 may measure 5 mm. This irrigation canal 26 allows for example cold sterile physiological saline to flow distally from the insertion point inside the patient and thus enables, to cool the fixation and/or target bones 100, 101 during the insertion operation, particularly if said insertion operation is a milling operation. It might also enable some body fluids or some surgery waste to flow proximally out of the patient's body during operation.

Figure 6A:
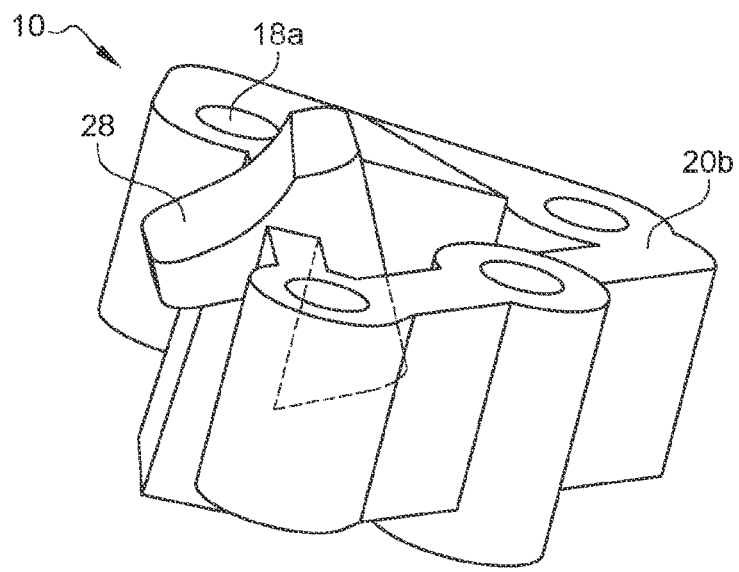
FIG. 6A is a is a perspective view from above of the invention according to a fifth embodiment.
Figure 6B:
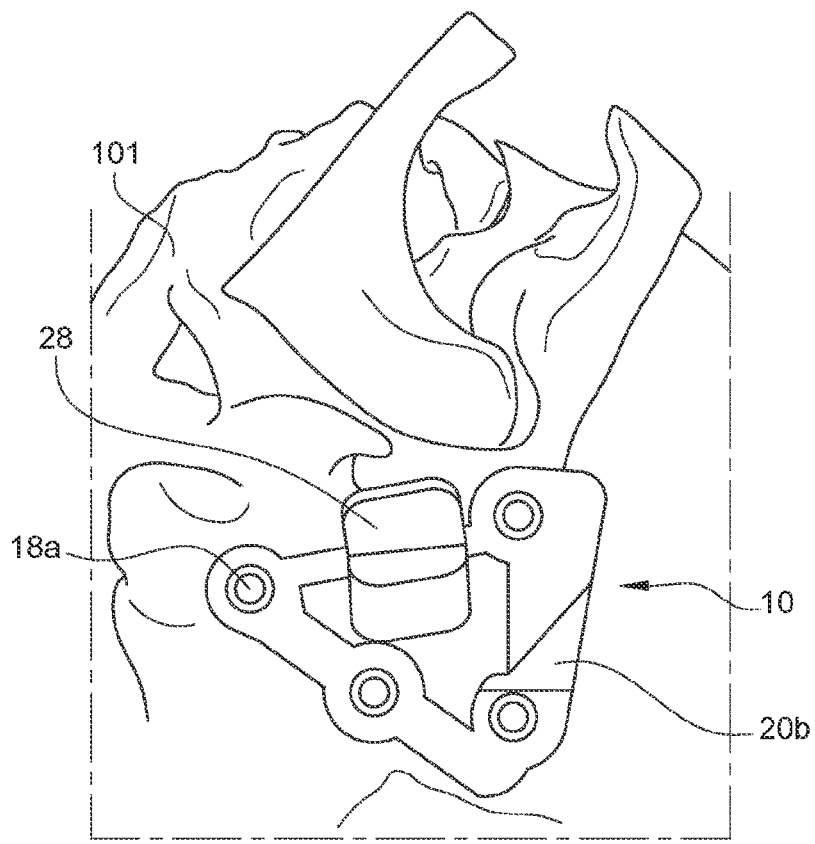
FIG. 6B is a view from above of the invention according to the embodiment of FIG. 6A

In some embodiments, as can be seen on FIGS. 6A and 6B, the personalized surgical guide 10 comprises a stabilization surface 28 configured to be put under pressure. This pressure can, for example, come from one of several fingers of the operator, or from a surgical elongated fixation element. The stabilization surface 28 can also serve as a resting surface for one or several fingers of the operator. The stabilization surface 28 is oriented upwards from the fixation bone 101, on the guide platform 14. The stabilization surface 28 might be part of the external surface 20b of the guide platform 14. In another embodiment, said stabilization surface 28 might be part of an independent element, clipped on the guide platform. The pressure exerted on the stabilization surface 28 leads to a reinforcement of the contact between the internal bone contact surface 20a and the fixation bone 101, as it pushes the guide platform 14 towards the fixation bone 101. This pressure thus leads to a stabilization of the positioning of the guide platform 14 on the fixation bone 101.

The personalized insertion guide 10 according to the present invention enables to implement a personalized surgical insertion method, the method comprising following steps in the order of enunciation:
running a geometrical analysis of the surface $S_0$ of the fixation bone 101 of the patient,
realizing a 3D model of the fixation bone 101 and its surface $S_0$,
designing the guide platform 14 in order to create a perfectly matching internal bone contact surface 20a,
3D printing the personalized surgical insertion guide 10 or, depending on the embodiments, the internal bone contact surface 20a of the guide platform,
positioning the personalized surgical insertion guide 10 on the fixation bone 101 of the patient,
securing the personalized surgical insertion guide 10 on the fixation bone 101 of the patient, the securing could be obtained by gluing the insertion guide 10 on the fixation bone 101,
introducing the elongated device 12 inside the insertion channel 16.

The method may further comprise the steps of:
determining the predetermined insertion axis X by means of a 3D modeling of the biological target element 103 with regards of the target and fixation bones 100, 101,
inserting the elongated device 12 inside the target bone 100 up to the maximal depth enabled by the length of the insertion channel 16.

Said personalized surgical milling method may induce an automatically carried out insertion of the elongated element 12. In this case, the insertion of the elongated element 12 may be carried out automatically by means of a robot (not represented).

This innovative personalized surgical guide 10 is the first custom 3D printed guide developed for minimally invasive surgery like, for example, cochlear implantation. The guide is inexpensive to manufacture and is quick and easy to use with an average operating time of 40 minutes. The objective of an average accuracy of less than 0.5 mm is achieved in 70% of cases. With an average precision of 0.6+/−[0.35] mm, this technique is considered as highly safe and precise. Specifically, regarding cochlear implants, the main clinical risks of facial nerve damage and erosion of the external auditory canal have not been observed during test phases, with safe mean minimum distances: 1.15+/−[0.46] mm for the facial nerve and 1.11+/−[0.56] mm for the duct. external auditory.

The invention claimed is:

1. A personalized surgical insertion guide configured to enable the mini-invasive and precise insertion of an elongated device in, through or beyond a target bone of a patient, said surgical insertion guide comprising:
a guide platform configured to be removably secured to a patient's fixation bone, the guide platform presenting an internal bone contact surface and an external surface, the internal bone contact surface being a matching negative of the fixation bone surface in order to allow one single precise positioning of the guide platform on the fixation bone,
at least one insertion channel extending through the guide platform, the at least one insertion channel being configured to receive the elongated device,
at least one bone fixation structure enabling the safe securing of the guide platform to the patient's fixation bone,
wherein the matching negative of the internal bone contact surface of the guide platform with the fixation bone surface is obtained by means of designing a 3D pre-surgical modelling of the patient's fixation bone, said modelling being based on a geometrical analysis of the fixation bone surface,
wherein the surgical insertion guide is designed to enable, once positioned on the fixation bone, to set an origin of a 3D insertion referential with regards to a biological target element inside the patient's body, in order to define an insertion axis enabling the mini-invasive and precise insertion of the elongated device, wherein the guide platform comprises a first part and a second part extending in two different planes, the first part being configured to cooperate with the fixation bone surface and the second part being configured to cooperate with a surface of a hole or a cavity comprised or communicating with the fixation bone.

2. The personalized surgical insertion guide according to claim 1, wherein the guide platform comprises a third part extending in a third plane different from the two other planes, the third part being configured to cooperate with a second surface of the hole or the cavity comprised or communicating with the fixation bone.

3. The personalized surgical insertion guide according to claim 1, wherein the biological target element is the cochlea, the target bone is the bony labyrinth and the fixation bone is the temporal bone of the patient.

4. The personalized surgical insertion guide according to claim 2, wherein the first part of the guide platform is configured to cooperate with the temporal bone of the patient, the second part of the guide platform is configured to cooperate with the surface of the external auditive conduct of the patient and the third part of the guide platform is configured to cooperate with the surface of the zygomatic process of the temporal bone of the patient.

5. The personalized surgical insertion guide according to claim 1, wherein the biological target element is a spot inside the patient's brain, the target bone is the skull and the fixation bone is the temporal bone of the patient.

6. The personalized surgical insertion guide according to claim 1, wherein the insertion channel displays a general U shape.

7. The personalized surgical insertion guide according to claim 1, wherein the bone fixation structure comprises three fixation holes formed in the guide platform, said fixation holes being configured to cooperate each one with a fixation screw, in order to screw the guide platform to the fixation bone.

8. The personalized surgical insertion guide according to claim 1, wherein the surgical insertion guide, once secured to the fixation bone of the patient, blocks six degrees of freedom defined by the 3D insertion referential for the elongated device to be inserted during an insertion operation.

9. The personalized surgical insertion guide according to claim 1, wherein the elongated device to be introduced is a milling bit.

10. The personalized surgical insertion guide according to claim 1, wherein the internal bone contact surface and the external surface of the guide platform are two separated elements which can be assembled in order to form the complete guide platform.

11. The personalized surgical insertion guide according to claim 1, wherein the external surface of the guide platform comprises a stabilization surface configured to be put under pressure in order to reinforce the contact between the internal bone contact surface and the fixation bone, thus leading to a stabilization of the positioning of the guide platform on the fixation bone.

12. A personalized surgical insertion system comprising an insertion guide according to claim 1 and an insertion robot aimed at manipulating the elongated device.

* * * * *